United States Patent

Wilfong et al.

[11] Patent Number: 5,951,855
[45] Date of Patent: Sep. 14, 1999

[54] FILTER AND HYDRAULIC MIXING ASSEMBLY FOR WATER TREATMENT

[75] Inventors: Rudy B. Wilfong, Fort Wayne; Alan B. Channell, Columbia City; Robert W. Wilfong; Terry S. Shears, both of Fort Wayne, all of Ind.

[73] Assignee: Chemical Engineering Corporation, Churubusco, Ind.

[21] Appl. No.: 08/959,420

[22] Filed: Oct. 28, 1997

Related U.S. Application Data

[60] Provisional application No. 60/032,248, Dec. 6, 1996.

[51] Int. Cl.$^6$ .................................................. B01D 24/46
[52] U.S. Cl. ........................ 210/136; 210/239; 210/279; 210/288; 210/289
[58] Field of Search ..................................... 210/189, 232, 210/239, 240, 268, 269, 275, 279, 289, 291, 136, 288

[56] References Cited

U.S. PATENT DOCUMENTS

| | | | |
|---|---|---|---|
| 1,692,939 | 11/1928 | Johnson | 210/293 |
| 2,087,442 | 7/1937 | Nack | 210/134 |
| 2,803,347 | 8/1957 | Whitlock, Jr. | 210/190 |
| 3,395,099 | 7/1968 | Johnson | 210/35 |
| 3,455,458 | 7/1969 | Johnson | 210/197 |
| 3,557,955 | 1/1971 | Hirs | 210/80 |
| 4,624,782 | 11/1986 | Gould | 210/268 |
| 4,814,074 | 3/1989 | Auchincloss | 210/143 |
| 4,871,463 | 10/1989 | Taylor et al. | 210/161 |
| 5,277,802 | 1/1994 | Goodwin | 210/232 |
| 5,472,609 | 12/1995 | Field | 210/541 |

Primary Examiner—Ivars Cintins
Attorney, Agent, or Firm—Baker & Daniels

[57] ABSTRACT

A filter and hydraulic mixing assembly for a water treatment system. The assembly includes two circulation tubes disposed alongside a center tube. During a backwash cycle fluid is conveyed through the center tube to a housing member where it is discharged immediately below the open bottom ends of the two circulation tubes thereby conveying media from the surrounding tank upwards through the circulation tubes. A cap member is fitted over the upper ends of the circulation tubes within the tank and direct the media being discharged from the circulation tubes into a downward spiraling helical flow pattern which provides enhanced agitation and lifting of the media bed. Discrete filter segments are selectively attachable to the housing member and interchanging the discrete filter segments permits the total filter slot area of the assembly to be adjusted and also permits the filter slot size to be altered. The filter segments are color coded, with each separate filter size having a different corresponding color. The color coding scheme provides an efficient and effective mechanism for preventing the inadvertent mixing of filter segments having different slot sizes.

25 Claims, 12 Drawing Sheets

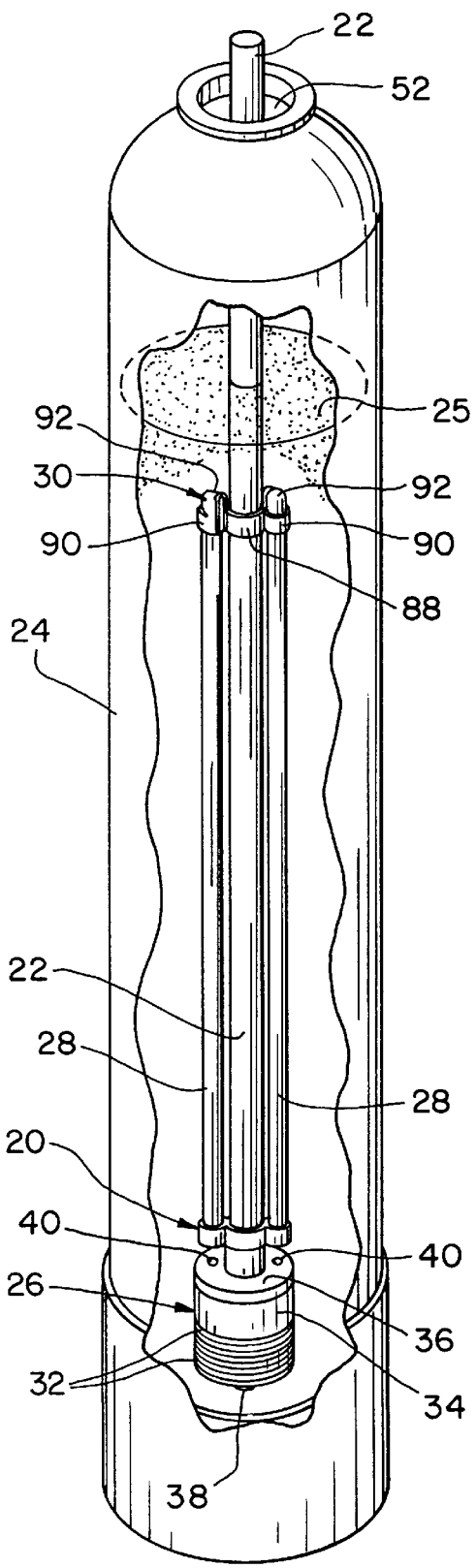
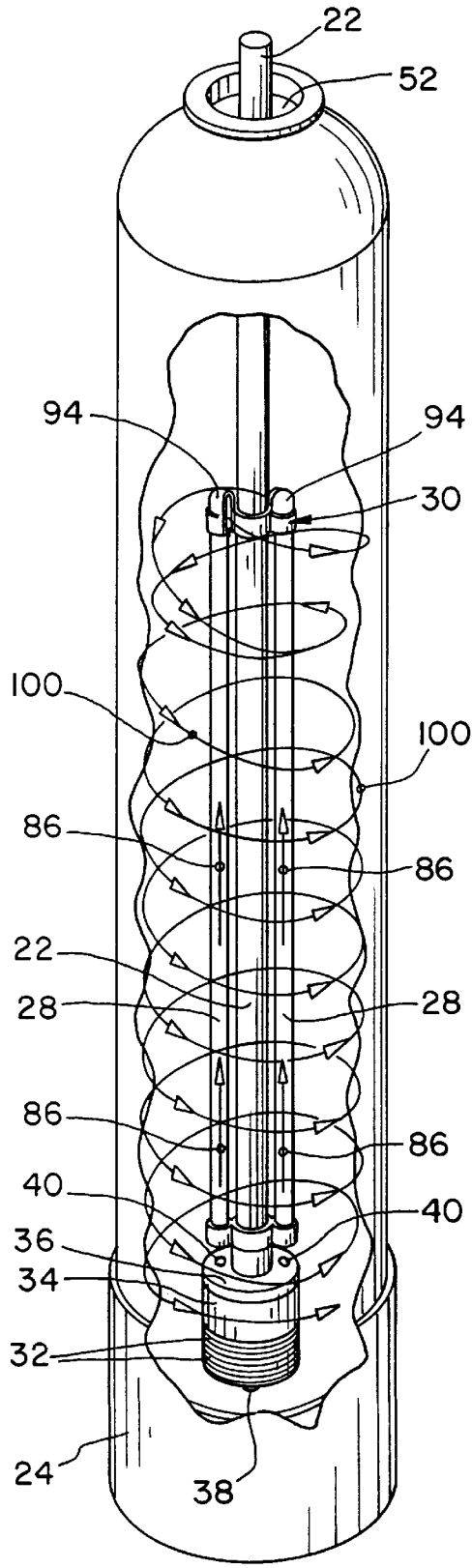
FIG. 1
FIG. 16

FILTER AND HYDRAULIC MIXING ASSEMBLY FOR WATER TREATMENT

CROSS REFERENCE TO RELATED APPLICATIONS

This application claims the benefit, under 35 U.S.C. §119(e), of U.S. Provisional Application Ser. No. 60/032,248 filed Dec. 6, 1996.

BACKGROUND OF THE INVENTION

1. Field of the Invention.

The present invention relates to residential and commercial water treatment systems, and, more particularly, to filter and hydraulic mixing assemblies for residential and commercial water treatment systems.

2. Description of the Related Art.

Residential and commercial water treatment systems include tanks that are generally used to hold media through which water is directed for treatment. A common water treatment method involves the use of a resin material such as polystyrene divinyl benzene to form small beads which act as a replenishable ion exchange medium. For example, the beads, or media, may be used to exchange sodium ions for calcium ions and, after the sodium ions attached to the media have been depleted (being replaced by calcium ions), a brinish solution containing sodium is used to exchange the calcium ions on the media for sodium ions. The media may, alternatively, exchange calcium ions for sodium ions and be replenished with a calcium solution or be utilized in a different ion exchange process and be replenished with an appropriate ionic solution.

Typically, the media is held in a water treatment tank, often a vertically oriented cylindrical tank, and untreated water is introduced into the tank near its upper end. A center tube is vertically disposed in the tank along its axis and withdraws water from near the bottom of the tank. Thus, the untreated water passes through the media held in the tank, ensuring contact between the media and the water. The bottom inlet of the center tube typically includes a filter basket to prevent the media from being discharged with the treated water from the tank through the center tube.

After the media has been depleted a replenishing cycle is required and typically includes a cleansing backwash cycle prior to introduction of an ionic solution into the tank. During the backwash cycle a fluid, such as untreated water, is introduced into the tank through the center tube.

In many assemblies the backwash fluid exits the filter assembly through the filter slots and then flows upward through the media bed. Alternative filter assemblies may include a check ball which directs the backwash fluid upwards through a one-way valve which is disposed directly below the open end of a vertical tube attached to one side of the center tube. As the backwash fluid enters the side tube, media located nearby also enters the side tube and is transported upwards towards the top of the tank.

The upper end of the side tube includes a check ball and filter arrangement which prevents downward flow through the side tube during normal operations and also slows the fluid and media being discharged from the upper end of the side tube during backwash operations. During the backwash cycle, the media is discharged from the side tube in a fountain-like fashion. An umbrella-type fitting located on the center tube above the upper end of the side tube is used to help direct the media discharged from the side tube in a horizontal and downwards direction towards the outer edges and bottom of the tank. Deflection of the media is necessary to prevent media from being discharged, together with the backwash fluid, through a drain line opening in a valve assembly located on the upper portion of the tank.

Although generally adequate for its purposes, there are several disadvantages with the prior art center tube, filter basket and side tube arrangement. For example, if the check ball is not included on upper end of the side tube assembly or the umbrella component is missing, the media may be discharged out of the opening near the top of the tank. Thus, an improved filter and hydraulic mixing assembly is desired.

SUMMARY OF THE INVENTION

The present invention provides an improved filter and hydraulic mixing assembly for use in water treatment tanks.

The invention comprises, in one form thereof, a filter housing having two one-way valves positioned below two circulation tubes, a cap member having two arcuate shrouds is positioned on the upper ends of the circulation tubes whereby backwash flow and media being discharged through the circulation tubes is directed in a circular flow pattern. The media follow a generally helical path as they descend towards the tank bottom. The filter assembly also includes a plurality of discrete filter segments which can be attached to the filter housing in different quantities. Thus, the total surface area of the filter slots which define the inlet area for the assembly, which is one of the variables determining the flow rate into the filter assembly, can be easily varied. The discrete filter segments can also be exchanged for alternative discrete filter segments which define a different filter opening size and wherein the segments defining differently sized slots may be differently colored to create an easily implemented color coding scheme for selecting the appropriate filter segments.

An advantage of the present invention is that the dual circulation tubes and cap member provide a more thorough mixing and cleansing of the media bed due to the helical flow of the media discharged from the circulation tubes and the use of two circulation tubes.

Another advantage is that the use of two circulation tubes enables the present invention to more quickly "turn over" or mix and cleanse the media bed.

Another advantage is that the discrete filter segments allow the total surface area of the filter inlet of the filter housing to be adjusted. A single filter assembly can thereby be used in variously sized tanks and for a variety of flow rates.

Yet another advantage is that the discrete filter segments attached to the filter housing may be exchanged to alter the filter slot opening size and thereby permit the use of different media sizes.

Still another advantage is that the segments defining different sized slot openings may be differently colored to prevent mixing of sizes and provide an easy to use system for matching appropriately sized filter slots with differently sized media.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a cutaway view of a water treatment tank showing a filter and hydraulic mixing assembly according to the present invention.

FIG. 16 is a schematic cutaway illustration of a tank and the filter and hydraulic mixing assembly during a backwash cycle.

Figure 2:
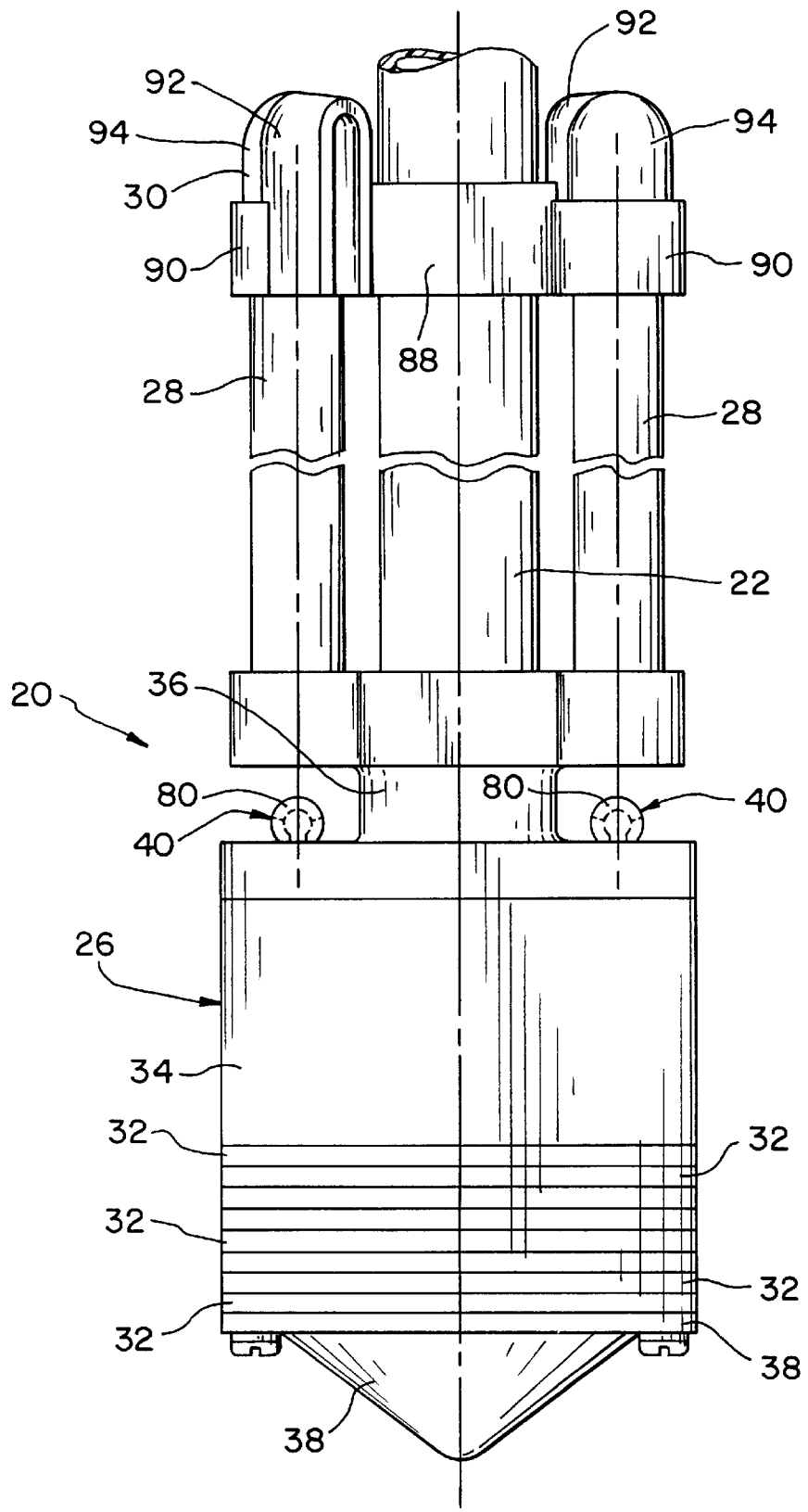
FIG. 2 is an elevational view of the assembly of FIG. 1.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and this exemplification is not to be construed as limiting the scope of the invention in any manner. The embodiment disclosed below is not intended to be exhaustive or limit the invention to the precise form disclosed in the following detailed description.

DESCRIPTION OF THE PRESENT INVENTION

Figure 5:
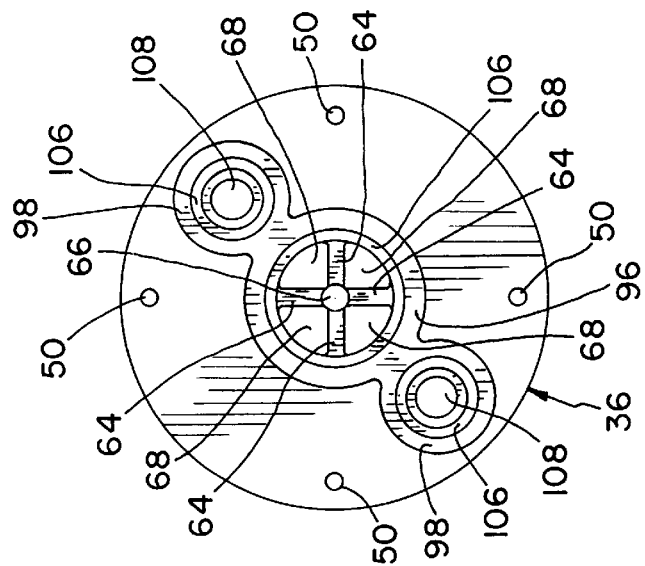
FIG. 5 is a view of a base member.
Figure 4:
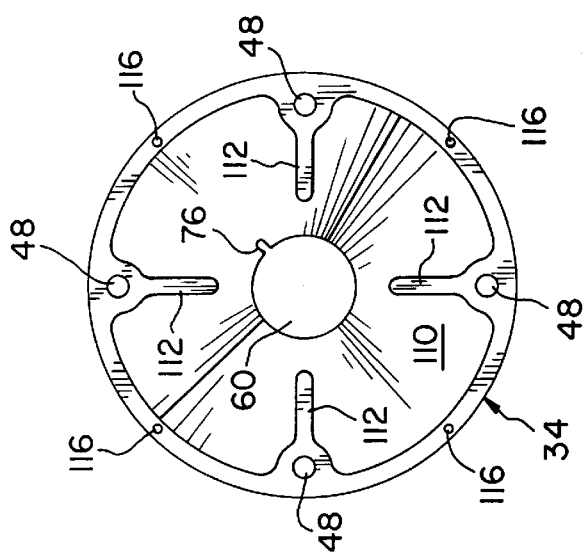
FIG. 4 is a view of a housing member.
Figure 6:
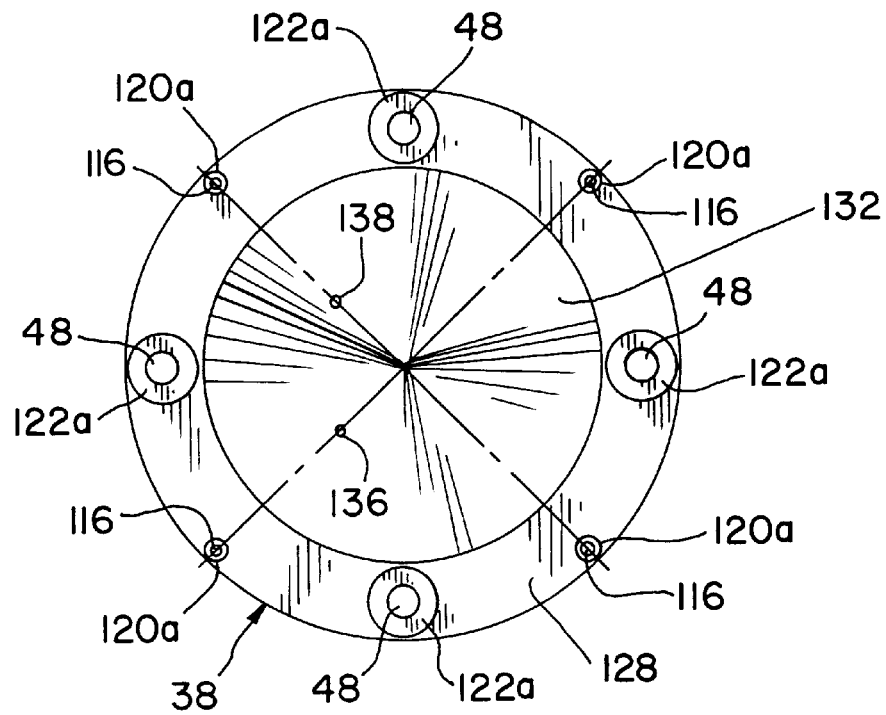
FIG. 6 is a view of a cone member.
Figure 7:
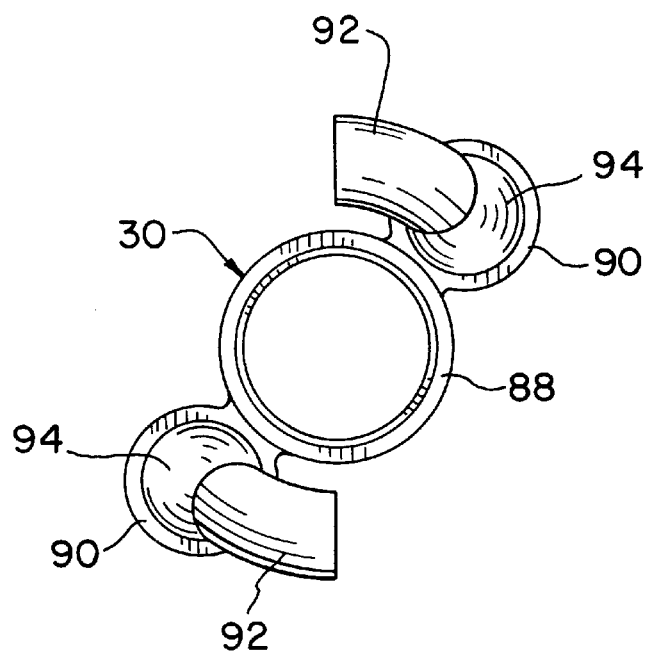
FIG. 7 is a view of a cap member.
Figure 9A:
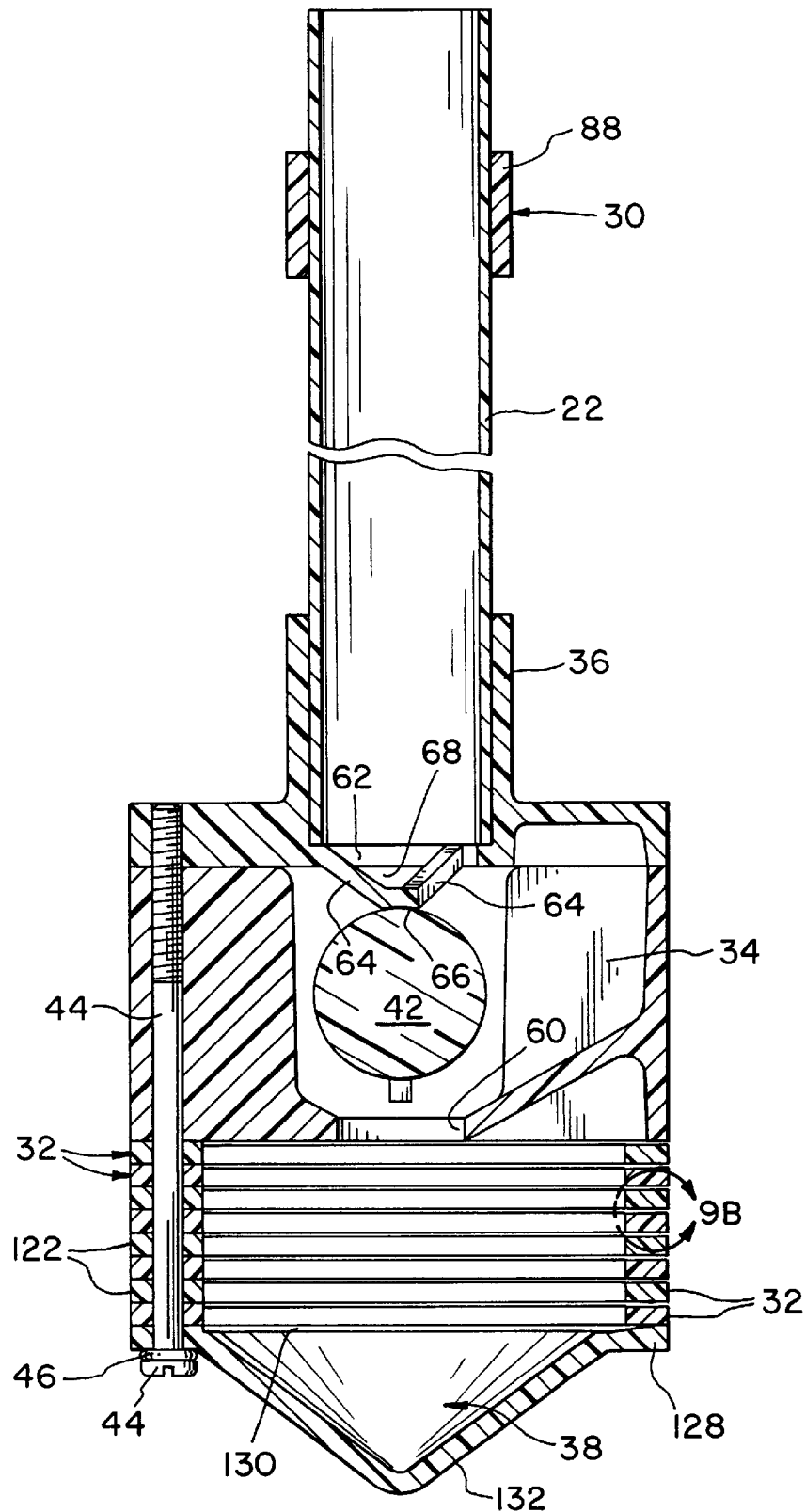
FIG. 9A is a crosssectional view of the filter and hydraulic mixing assembly taken along section line 9—9 of FIG. 3.
Figure 10:
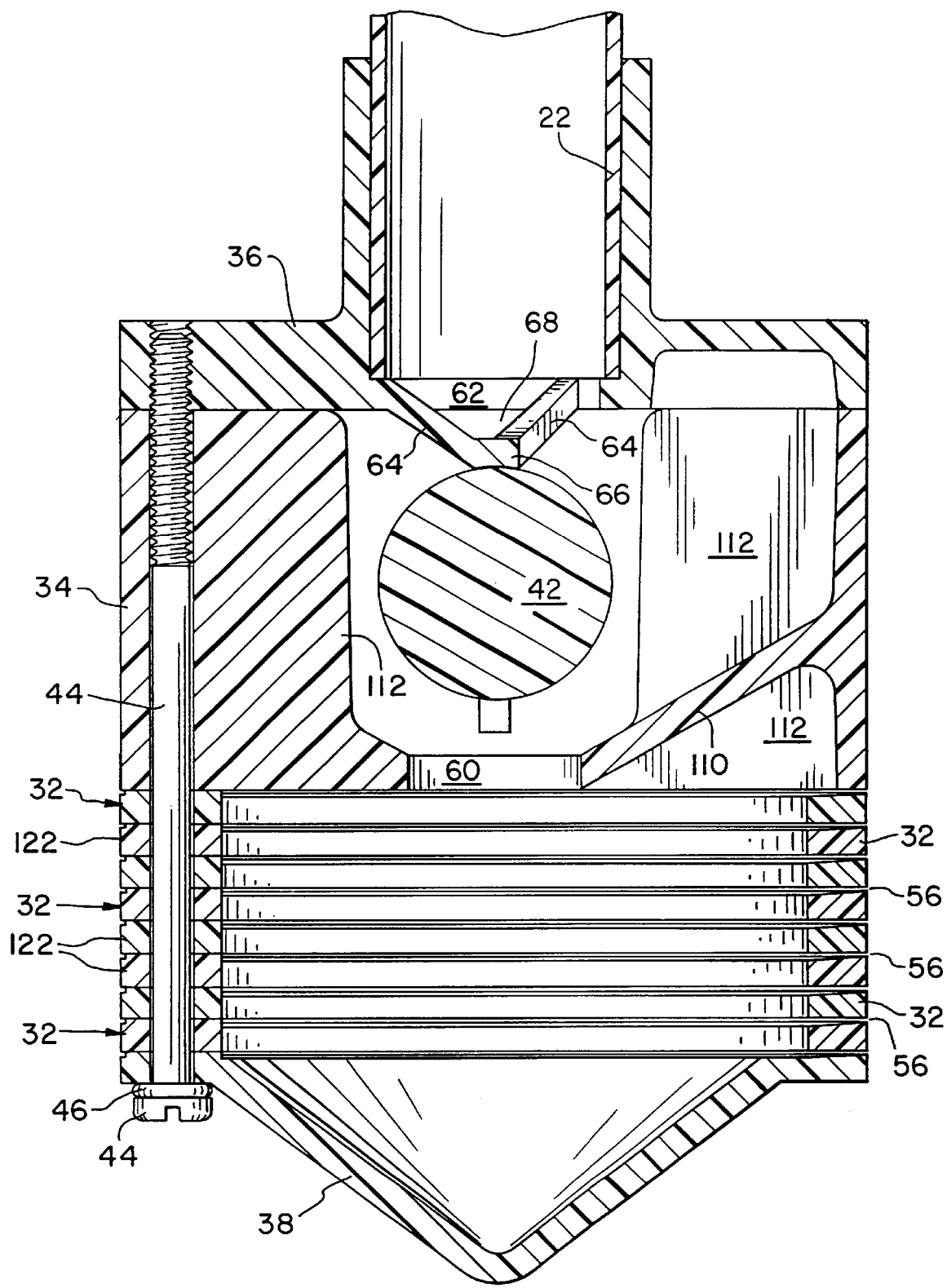
FIG. 10 is an enlarged view of a portion of FIG. 9A and illustrates the filter assembly.

Referring now to the drawings and particularly to FIG. 1, there is shown a filter and hydraulic mixing assembly 20 connected to a center tube 22 and centrally disposed in cylindrical water treatment tank 24. The filter and hydraulic mixing assembly 20 includes a valve and filter assembly 26, two circulation tubes 28 and a cap member 30. The major components of the valve and filter assembly 26 are filter segments 32 (FIG. 3), housing member 34 (FIG. 4), base housing member 36 (FIG. 5), cone member 38 (FIG. 6), resilient, spherical checkvalves 40 (FIG. 2) and check ball 42 (FIG. 10).

As shown in FIGS. 8A–10, base housing member 36, housing member 34, filter segments 32 and cone member 38 are secured together by means of a threaded fastener 44. An o-ring 46 is used with fastener 44 and serves as a lock washer without damaging cone member 38. O-ring 46 also allows for thermal and/or hydraulic expansion shock. O-ring 46 is installed on fastener 44 which is inserted through bore holes 48 in housing member 34, filter segments 32 and cone member 38 and engages a threaded aperture 50 in base member 36. Alternative embodiments may utilize a non-threaded bore hole in base member 36 and a nut which engages threaded fastener 44 above the bore hole in base member 36 with an integral head or second nut on the opposite end of the fastener shaft. Numerous other fastener configurations are also possible.

Figure 11:
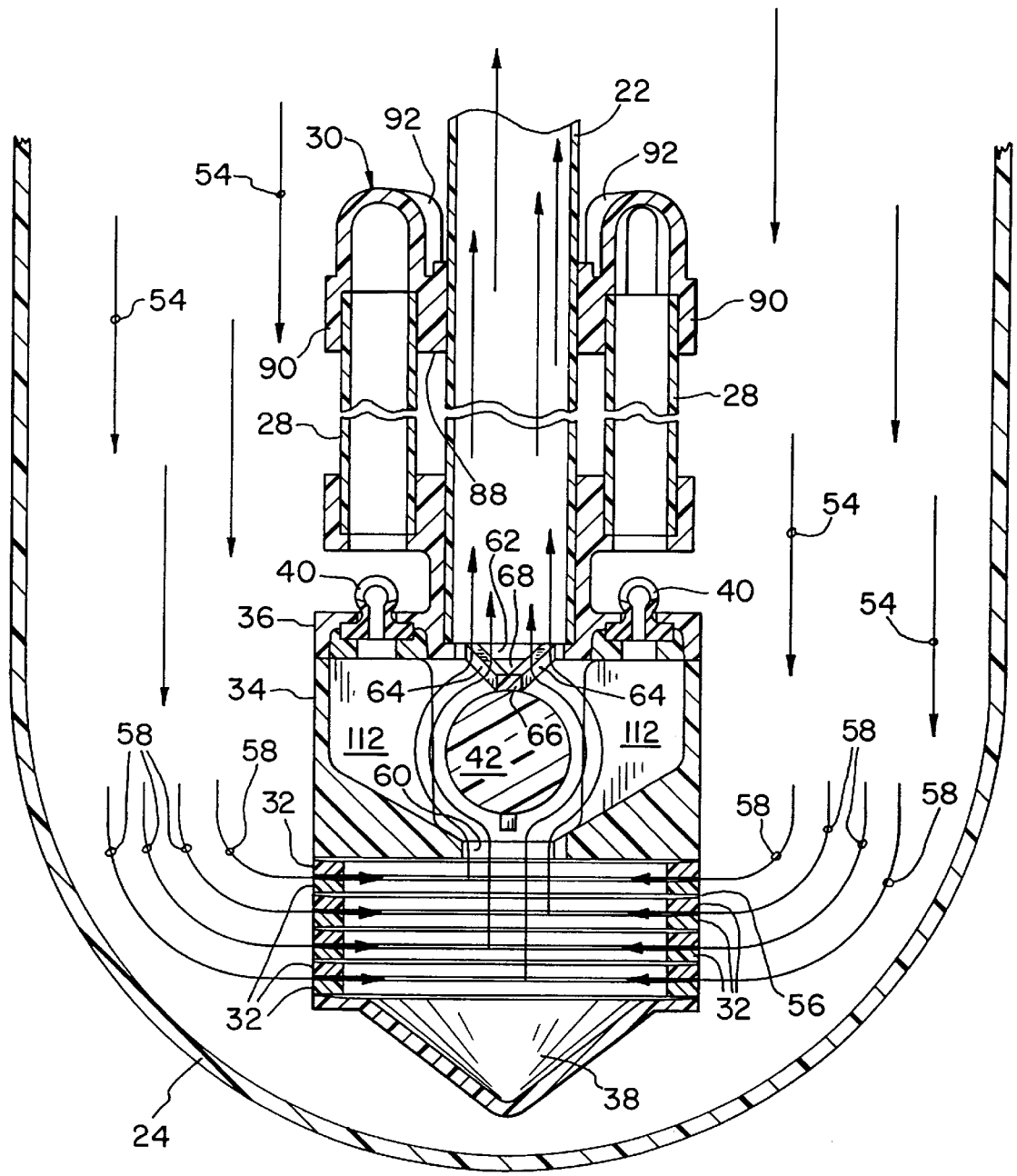
FIG. 11 is a schematic elevational illustration of a tank and the filter and hydraulic mixing assembly during service flow.

The operation of filter and hydraulic mixing assembly 20 will now be described. During service flow conditions, schematically illustrated in FIG. 11, untreated water is introduced by a valve assembly (not shown) through tank opening 52. The untreated water flows downward through media in water treatment tank 24 as shown by arrows 54 (the media is not shown in FIG. 11). As the water flows downward through the tank interior, it reacts with a treatment media 25 (the upper surface of which is schematically represented in FIG. 1) to thereby treat the water. The treated water then enters the filter and hydraulic mixing assembly 20 located near the bottom of tank 24 through filter slots 56 as indicated by flow arrows 58. Filter slots 56 prevent the treatment media from entering the interior space of the filter assembly defined by filter segments 32 and cone member 38 with the treated water which is then directed upwards through a lower orifice 60 in housing member 34. The treated water then flows through an upper orifice 62 in base member 36 and enters the center tube 22.

Check ball 42 is forced upwards by the upward flow of treated water but does not block upper orifice 62 because of a projection which is defined by four projecting arms 64 interconnected by a small disk 66. The treated water is thereby permitted to flow around check ball 42 and through openings 68 located between projecting arms 64. After entering tube 22 the treated water is removed from the tank 24 and directed towards a use point by means of a piping system which is not shown. The flow of the untreated and treated water is controlled by pumps or other suitable means which are not illustrated.

Figure 12:
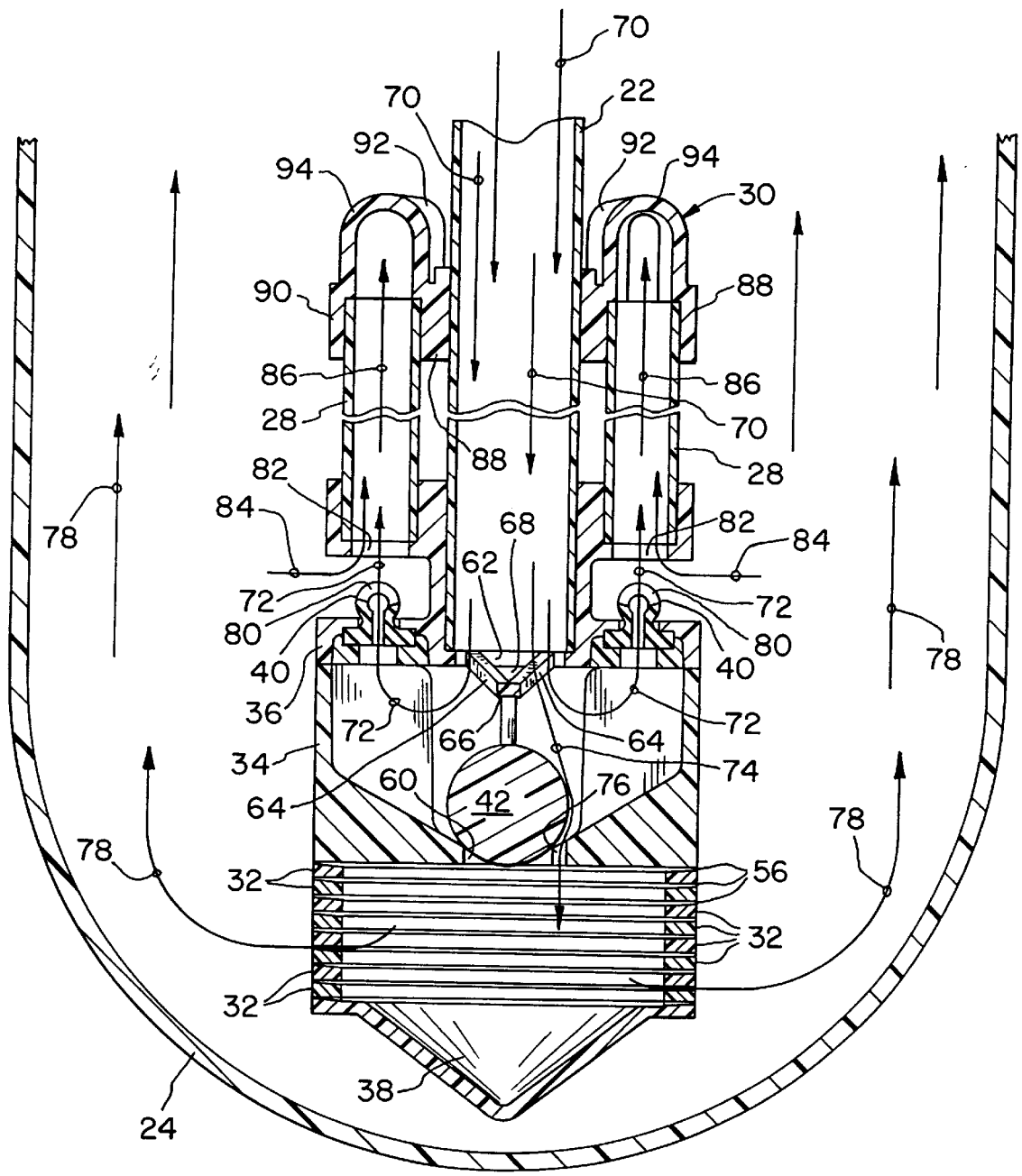
FIG. 12 is a schematic elevational illustration of a tank and the filter and hydraulic mixing assembly during a backwash cycle.

During a backwash cycle, backwash fluid, typically untreated water, is introduced into the tank 24 through an elongate conduit as schematically illustrated in FIG. 12 as center tube 22. The backwash fluid is withdrawn through a drain line opening located in a valve assembly (not shown) disposed in tank opening 52. A number of different valving arrangements well known in the art are suitable for use with the present invention. When using a media such as resin beads formed of polystyrene divinyl benzene in an ion exchange process to treat water, a backwash cycle followed by a brining cycle is periodically required to cleanse and replenish the media.

Agitation of the media bed is desirable for cleansing purposes and facilitates the discharge of material filtered by the media bed by suspending and discharging the filtered material in the discharged backwash fluid. Agitation of the media bed also results in abrasive forces on the individual media beads, creating a scrubbing effect. A thorough mixing of the entire media bed is desirable, not only to cleanse the entire bed, but also to "lift" the bed. During the normal operations of the tank, the media bed can become compacted as the media beads settle towards the bottom of the tank. It is also possible that bridging can occur in the media bed; this is an undesirable process by which the untreated water entering the tank creates small channels in the media bed leading to the center tube inlet. If such channels form, the untreated water will contact only a limited quantity of the media and the untreated water will rapidly deplete the media immediately surrounding the channels in the media bed, leading to the discharge of water which has not been completely treated. Lifting the bed is the process of suspending and agitating the media with the backwash fluid to counteract the effects of settling and channelling and thoroughly mixing the media to reposition the individual media beads within the tank.

After the backwash cycle is complete and the media have been cleansed and lifted, a brining cycle is used to replenish the media. The brining cycle involves introducing a brining solution containing the ion which will be exchanged with ions, such as calcium and magnesium, found in untreated water during normal, service flow, operation of the water treatment system. The ions, e.g., calcium and magnesium, removed from the untreated water remain in the media bed during service flow conditions. Typically, the brining solution is introduced through the inlet opening of the valve assembly and flows through tank 24 in the service flow pattern discussed above in a process referred to as downflow brining. The valve assembly, however, is used to divert the brining solution being discharged from the center tube 22 to a drain line rather than a use point. It is also possible to use an up-flow brining method and introduce the brining solution into the tank through the center tube 22 in a flow pattern similar to the backwash cycle discussed in greater detail below. The helical flow patterns generated by the present invention provide a longer contact time between the media and the brining solution than the contact time typically provided by the use of a single, fountain-type, backwash tube.

In the backwash cycle effected by the present invention, the backwash fluid flows down center tube 22 as indicated by flow arrows 70. After entering the interior space of the valve assembly defined by housing member 34 and base member 36, the majority (an estimated 90% of the flow in the illustrated embodiment) of the backwash fluid reverses its flow direction and exits assembly 20 through one-way spherical valves 40 and subsequently reenters assembly 20 and travels upwards through two conduits, i.e., circulation tubes 28 in the illustrated embodiment, as shown by flow arrows 72. Checkball 42 is seated in lower orifice 60 due to the flow of the backwash fluid. Checkball 42 inhibits the discharge flow of backwash fluid from housing member 34 through orifice 60, which is schematically represented by flow arrow 74, by restricting discharge flow 74 to slot 76. The downwardly directed discharge flow 74 then exits assembly 20 through slots 56 and flows upwards in tank 24 as indicated by flow arrows 78. The upwardly flowing backwash fluid 78 is subsequently discharged from tank 24 through a discharge opening (not shown) located near the top of tank 24.

In contrast to flow 78, the majority of the backwash fluid is discharged through one-way valves 40 which are spheroidal and have a slit 80 (FIGS. 2 and 12) which enable fluid within housing member 34 to exit assembly 20 through valves 40 but prevents fluid from entering assembly 20 through valve 40. Although valve 40 is shown as a spheroidal checkvalve, alternative one-way valves, such as duckbill valves and flap valves, can also be used. Valve 40 has a doughnut shaped foot 102 which is held between base member 36 and inlay 104 to thereby mount valve 40. Inlay 104 is formed of plastic, such as ABS plastic, and is affixed to base member 36 and has a bore hole which provides fluid communication between the interior of housing member 34 and the interior of valve 40. Inlay 104 is attached to base member 36 using sonic welding, however, other methods of attachment such as adhesives or heat staking can also be used. In addition to its mounting function, foot 102 also prevents media from entering assembly 20 through aperture 108 (FIG. 5) in base member 36 through which valve 40 extends.

As can be seen in FIG. 12, tubes 28 are aligned with valves 40 so that as backwash fluid 72 exits valves 40 it enters the bottom of circulation tubes 28 through lower inlet entry ports 82 defined by base member 36. Media from the surrounding area of tank 24 also enters tubes 28 as illustrated by arrows 84. The combined flow 86 of media and backwash fluid is then conveyed upwards within circulation tubes 28. It will be appreciated that circulation tubes 28 are shown having a disproportionately short length in FIGS. 8A–9B and 11–12.

Figure 13:
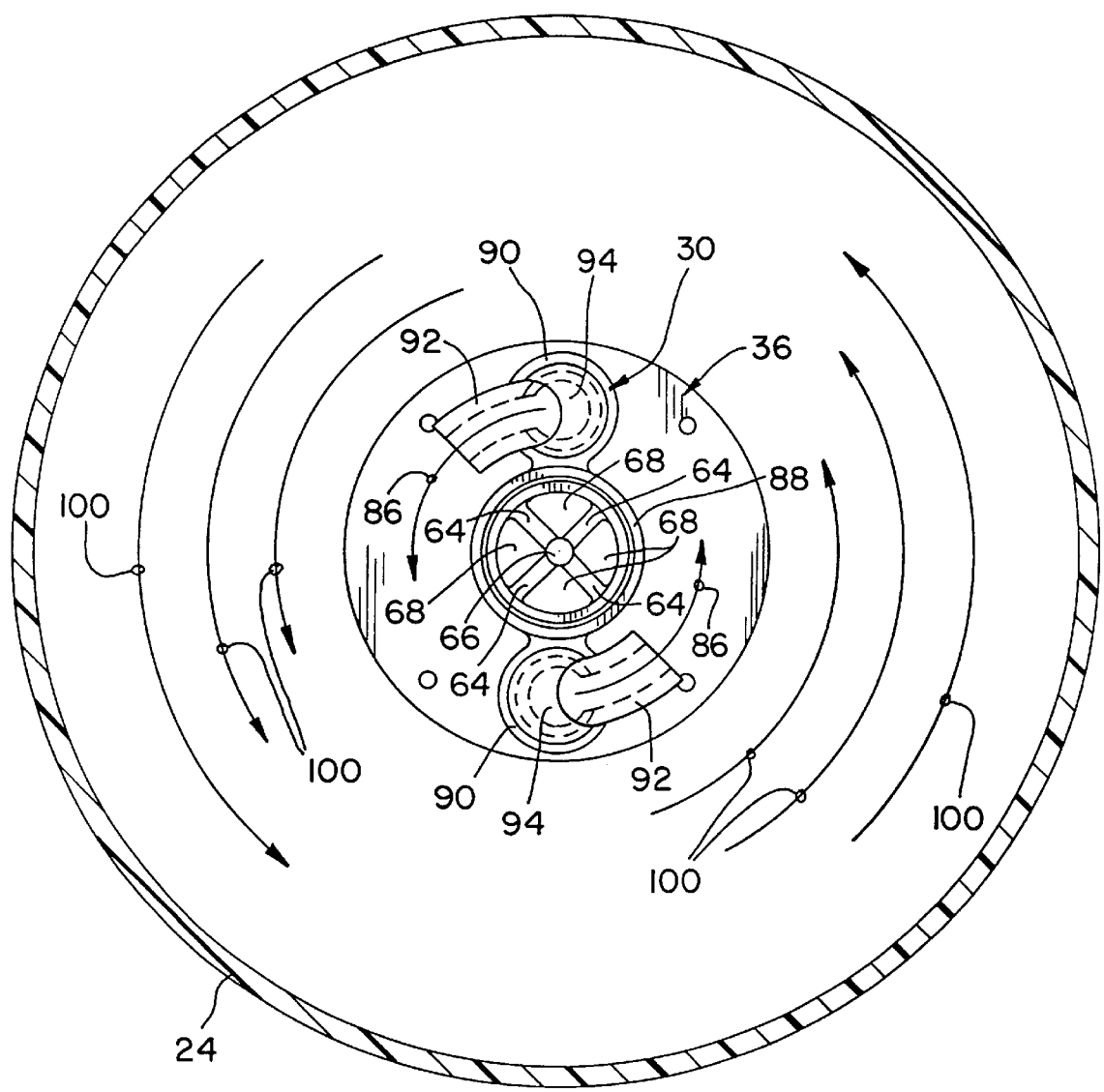
FIG. 13 is schematic sectional illustration of a tank and the filter and hydraulic mixing assembly during a backwash cycle.
Figure 14:
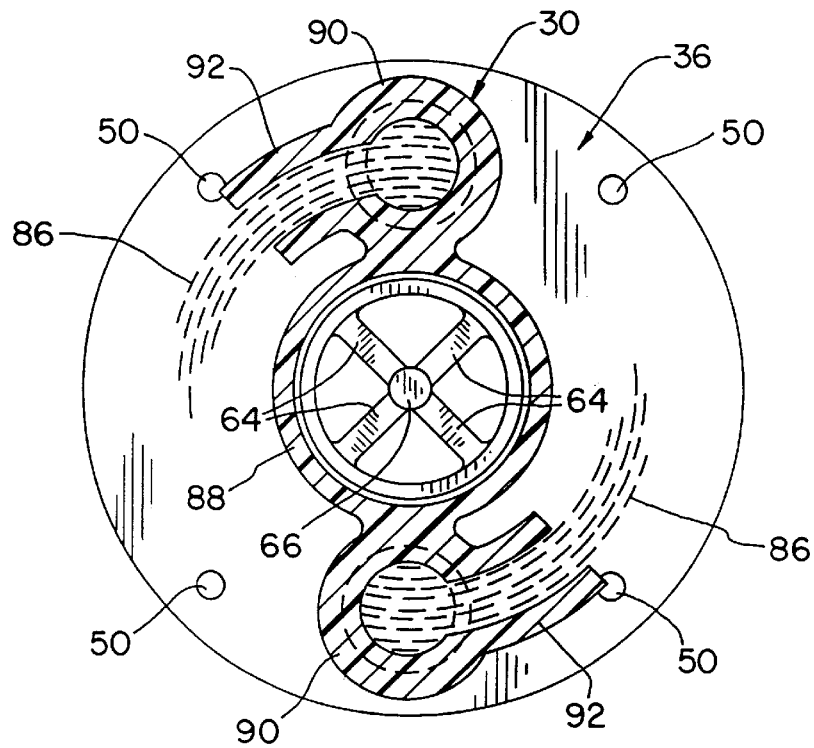
FIG. 14 is a sectional view of the filter and hydraulic mixing assembly during a backwash cycle.
Figure 15:
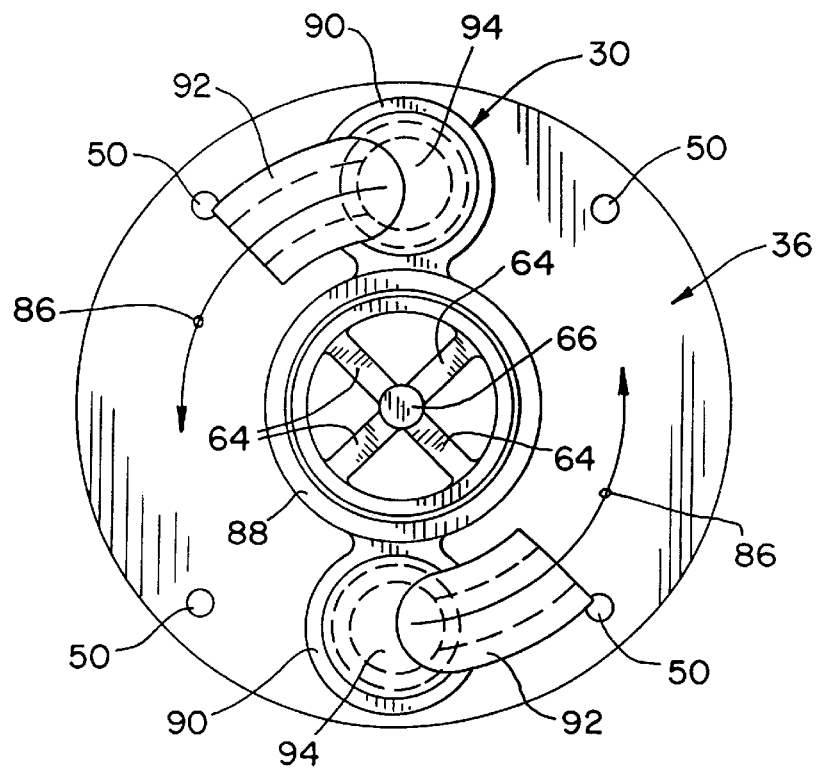
FIG. 15 is a schematic illustration of the filter and hydraulic mixing assembly during a backwash cycle.

When the combined flow 86 of media and backwash fluid reaches the upper end of circulation tubes 28, cap member 30 redirects flow 86 to form a circular flow pattern as shown in FIGS. 13–15. Cap member 30 includes a circular center collar 88, two C-shaped collars 90, two arcuate shrouds 92 which have a crossection shaped like an inverted U and two cap portions 94. Cap portions 94 are each attached to a shroud 92 and located above a collar 90. Shrouds 92 thereby form outlet members which respectively define an upper discharge outlet for each tube 28. Shrouds 92, in plan view, form arcuate outlet passage which are both directed either clockwise or counterclockwise relative to the tank interior and thereby define the common rotational direction in which flow 86 is discharged.

Cap portions 94 have a shape which combines portions of a cylinder and portions of a sphere. Cap portion 94 and shrouds 92 angle slightly downward as they extend from tubes 28 in the discharge direction of flow 86 thereby directing the discharge from tubes 28 towards the bottom of the tank. The illustrated embodiment utilizes a downward angle of approximately 5° relative to a horizontal plane, other angles, however, may also be utilized.

Collar 88 is integrally formed with collars 90 and cap member 30 and thereby maintains the upper ends of circulation tubes 28 in a fixed relationship to center tube 22 and to the other tube 28. The bottom ends of circulation tubes 28 are held in a fixed relationship with center tube 22 and the other tube 28 by base member 36. To secure tubes 22, 28, 28 in a fixed relationship, base member 36 includes a center collar 96 and two collars 98. Tubes 22 and 28 may be formed of a plastic material such as polyvinylchloride (PVC) and cap member 30, filter segments 32, housing member 34, base member 36 (excluding valves 40) and cone member 38 are formed of acrylonitrile butadiene styrene (ABS), however, other suitable materials may also be used. Collars 88 and 96 may be secured to center tube 22 and collars 90 and 98 to circulation tubes 28 with an appropriate adhesive. Appropriate adhesives are known in the art. Collars 96 and 98 located on base member 36 have an interior, radially inwardly projecting lip 106 which abuts the terminal end of center tube 22 and circulation tubes 28 and limits he extent to which the tubes 22, 28 may be inserted into base member 36.

After the combined flow 86 of backwash fluid and media are discharged in a circular flow pattern from cap member 30, the media travel downwards in a helical pattern as shown by arrows 100 in FIGS. 13 and 16. The downwardly moving media 100 contact, and are agitated by, the backwash fluid 78 travelling upwards in tank 24 in addition to the mixing and scrubbing action created by the helical flow 100 of the media. This flow pattern also enhances the contact between a brining solution and the media when the replenishing brining solution is introduced into tank 24 through center tube 22 in an upflow brining process. As the media nears the bottom of tank 24 it is drawn towards the low pressure zone created by flow 72 and converges on entry ports 82 further enhancing the scrubbing and mixing of the media within tank 24. The low pressure zone which draws the media into the circulation tubes 28 is created by the fluid which is flowing out of valves 40 and into tubes 28 thereby creating a Venturi effect.

As described above, checkball 42 is located within housing member 34. Sloped, generally conical bottom wall 110 of housing member 34 directs checkball 42 towards lower orifice 60 when checkball 42 is not being lifted by upflowing fluids. Ribs 112 are disposed vertically in housing member 34 and provide strength and rigidity to housing member 34. Ribs 112 also help direct the flow of fluid within assembly 20. Ribs 112 are substantially rectangular and extend above and below bottom wall 110. In addition to the four ribs 112 (FIG. 4) four additional, generally triangular ribs 114 (FIG. 8A) are located below bottom wall 110 midway between ribs 112. The upper surface of housing member 34 includes four locator pins 116 which mate with locator holes 118 in base member 36 and, together with bore holes 48 properly position housing member 34 with respect to base member 36. The upper surface of housing member 34 abuttingly contacts the lower surface of base member 36.

Figure 3:
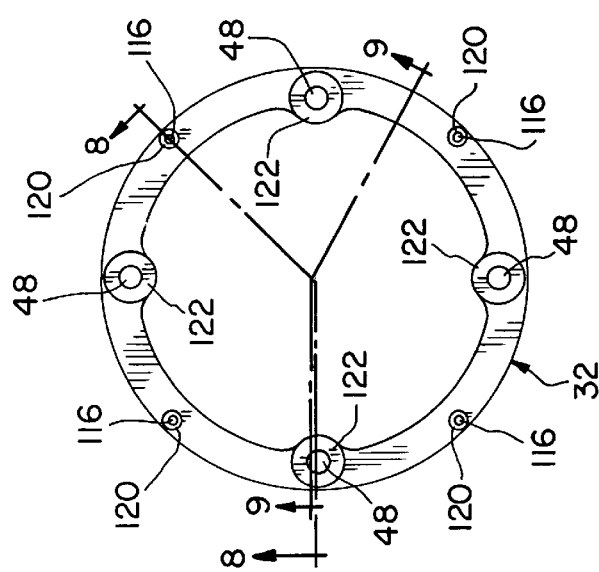
FIG. 3 is a view of a filter segment.
Figure 8A:
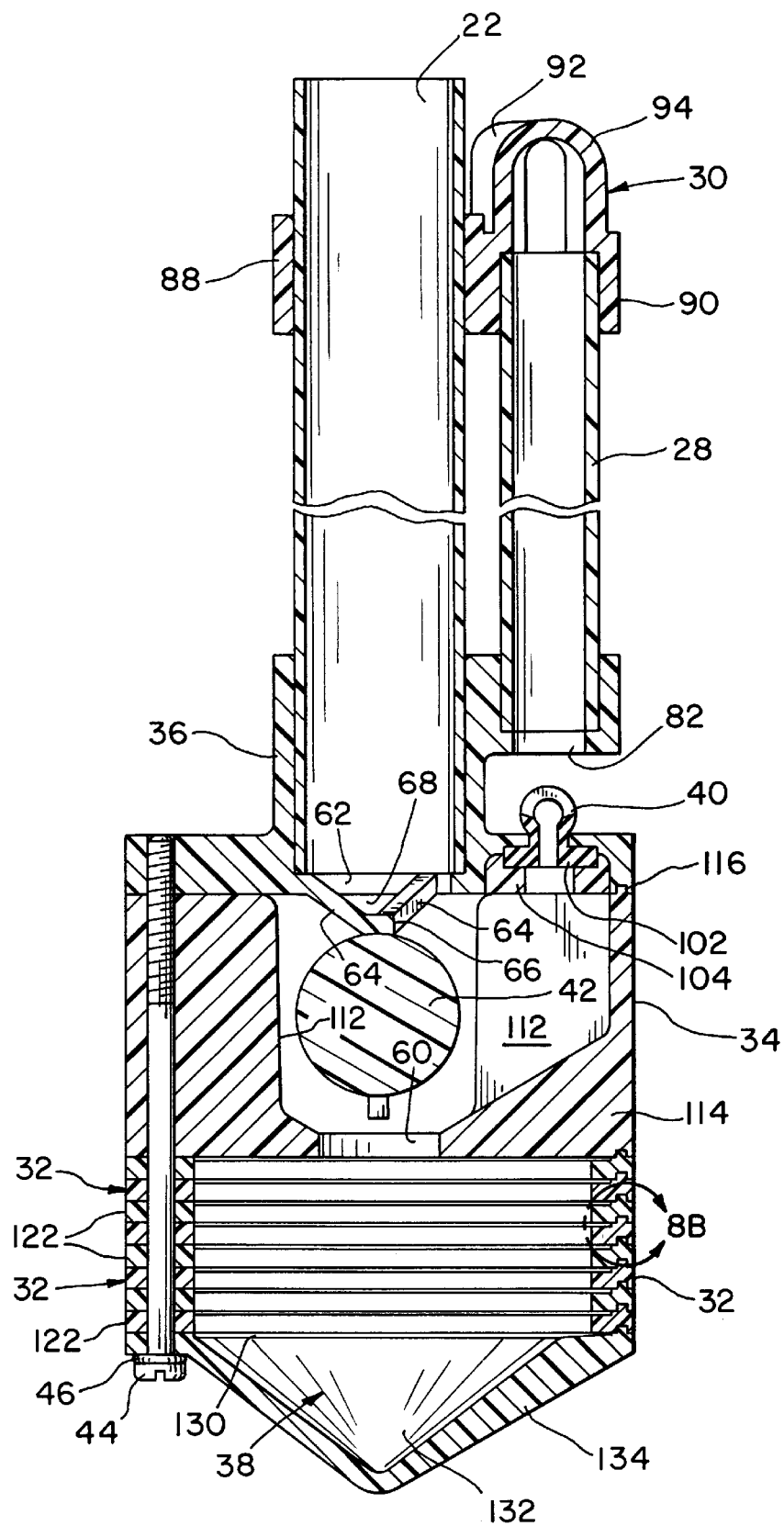
FIG. 8A is a crosssectional view of the filter and hydraulic mixing assembly taken along section line 8—8 of FIG. 3.
Figure 8B:
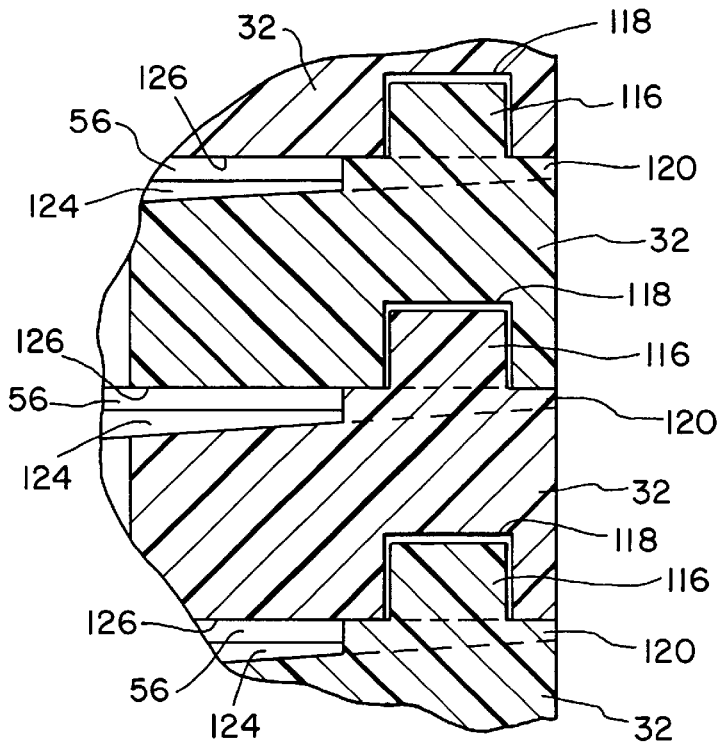
FIG. 8B is an enlarged view of a portion of FIG. 8A and illustrates the filter segments and filter slots.
Figure 9B:
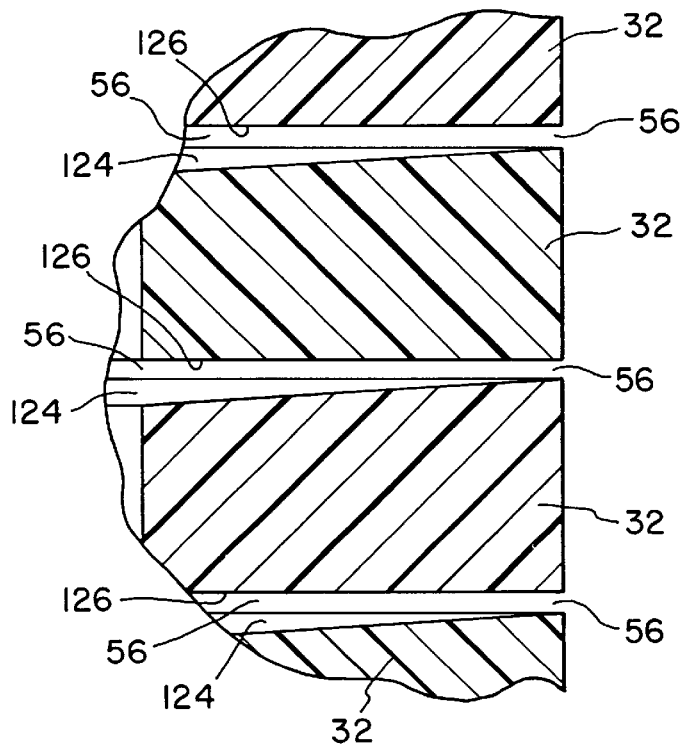
FIG. 9B is an enlarged view of a portion of FIG. 9A and illustrates the filter segments and filter slots.

The bottom surface of housing member 34 includes locator holes 118 which mate with corresponding locator pins 116 of a filter segment 32. Locator pins 116 disposed on the upper surface 124 of filter segments 32 extend from a raised pad 120 as shown in FIGS. 3 and 8B. The height of raised pad 120, as well as the thickness of annular ring portions 122 surrounding bore holes 48, determine the size of filter slot 56. Filter segments also include locator holes 118 on their lower surface 126 for mating with locator pins 116. As best seen in FIGS. 8B and 9B, lower surface 124 and upper surface 126 define filter slots 56 and lower surface 124 slopes away from upper surface 126 in an inwardly radial direction. The use of locator pins 116 and holes 118 facilitates the proper alignment of filter segments 32 and also helps maintain filter segments 32 in an aligned stack when filter segments 32 are being attached or removed from an assembly 20.

The total filter slot surface area is one of the variables which determine the flowrate of water through a water treatment system employing assembly 20. The use of discrete filter segments 32 permit assembly 20 to be utilized in different applications having different flow rates by permitting the total slot surface area to be adjusted by either adding or subtracting discrete filter segments 32 to assembly 20. The same assembly 20 can therefore be used in two differently sized tanks wherein different flow rates are desired.

The ability to selectively interchange discrete filter segments 32 also permits filter segments 32 having differently sized filter slots 56 to be used to form assemblies 20 adapted for use with differently sized media. The ability to interchange discrete filter segments 32 also enables the removal of filter segments 32 having a first slot size 56 and their replacement with filter segments having a second slot size to thereby permit a single assembly 20 to be utilized with differently sized media. The filter segments 32 may be color coded, with each predefined slot size corresponding to a predefined unique color. For example, filter segments having a first filter slot size could be red, filter segments having a second filter slot size could be blue, and so on. Color coded filter segments 32 are useful in preventing the accidental intermixing of differently sized filter segments. The color coding of filter segments 32 also enables the choice of the properly sized filter segment 32 to be determined by selecting the appropriate color of segment for a particular media.

The ability to adjust the total filter slot area and the filter slot size and filter slot size by merely exchanging the discrete filter segments 32 without exchanging the entire valve and filter assembly 26 creates manufacturing efficiencies by permitting a small number of components to be used to manufacture assemblies 20 specifically designed for a variety of different operating conditions. The interchangeability of filter segments 32 also permits users of assembly 20 to economically retrofit assembly 20 for different applications by exchanging filter segments 32 rather than the entire assembly 20.

Cone member 38 is attached to the bottom filter segment 32. Cone member 38 includes an annular flange portion 128 having an upper surface 130 which is sloped away from the filter segment 32 disposed adjacent thereto in the radially inward direction. Cone member also includes raised pads 120*a*, from which locator pins 116 extend, and annular ring portions 122*a* surrounding bore holes 48 which are similar to those found on filter segments 32. A cone portion 132 forms the bottom interior surface of assembly 20. Four ribs 134 are located on the exterior of cone portion 132 and are disposed in alignment with ribs 114, when cone member 38 is installed, and are also aligned with the mutually perpendicular diametrical lines 136, 138 connecting locator pins 116.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A water treatment system, comprising:
   a tank defining a tank interior, a treatment media disposed within the tank interior, and an elongate conduit at least partially disposed within the tank interior wherein backwash fluid is introducible into the tank interior through the elongate conduit;
   a housing element attached to the elongate conduit and having an interior space in fluid communication with the elongate conduit and fluidly communicable with the tank interior whereby backwash fluid introduced into said interior space through the elongate conduit is dischargeable into the tank interior, said housing element comprising a filter assembly;
   first and second conduits, each of said first and second conduits having an upper outlet and a lower inlet disposed within the tank interior, said lower inlets in fluid communication with said tank interior and positioned to receive backwash fluid discharged from said interior space and treatment media from the tank interior; and
   first and second outlet members respectively defining said upper outlets of said first and second conduits, said first and second outlet members being oriented to discharge the received backwash fluid and treatment media in a common rotational direction relative to the tank interior, whereby a helical flow pattern is produced in the tank interior.

2. The water treatment system of claim 1 wherein each of said first and second outlet members extend and angle downwardly in a discharge direction.

3. The water treatment system of claim 1 wherein said first and second outlet members each comprise a shroud defining said upper outlets, said shrouds having an inverted substantially U-shaped cross section.

4. The water treatment system of claim 1 wherein each of said outlet members forms an arcuate outlet passage defining said common rotational direction.

5. The water treatment system of claim 1 wherein said first and second conduits are disposed on diametrically opposite sides of the elongate conduit and said first and second outlet members are attached to a collar member disposed on the elongate conduit.

6. The water treatment system of claim 5 wherein said first and second outlet members each comprise a shroud defining said upper outlets, said shrouds having an inverted substantially U-shaped cross section and each of said shrouds forms an arcuate outlet passage defining said common rotational direction.

7. The water treatment system of claim 1 wherein said housing element further comprises a valve assembly having a first one-way valve in fluid communication with said interior space and backwash fluid is dischargeable from said interior space to the tank interior through said first one-way valve.

8. The water treatment system of claim 7 wherein said valve assembly further comprises a second one-way valve in fluid communication with said interior space and backwash fluid is dischargeable from said interior space to the tank interior through said second one-way valve and wherein said first and second one-way valves are respectively positioned in alignment with said lower inlets of said first and second conduits.

9. The water treatment system of claim 8 wherein said first and second outlet members each comprise a shroud defining said upper outlets, said shrouds having an inverted substantially U-shaped cross section and each of said shrouds forms an arcuate outlet passage defining said common rotational direction.

10. The water treatment system of claim 8 wherein a third valve provides fluid communication between said filter assembly and said interior space, whereby opening said third valve allows filtered water to enter said interior space from said filter assembly and closing said third valve inhibits the discharge of backwash fluid from said interior space to said filter assembly.

11. The water treatment system of claim 10 wherein said first and second outlet members each comprise a shroud defining said upper outlets, said shrouds having an inverted substantially U-shaped cross section and each of said shrouds forms an arcuate outlet passage defining said common rotational direction.

12. A water treatment system, comprising:

a tank defining a tank interior, a treatment media disposed within the tank interior, and an elongate conduit at least partially disposed within the tank interior wherein backwash fluid is introducible into the tank interior through the elongate conduit;

a housing element attached to the elongate conduit and having an interior space in fluid communication with the elongate conduit, said housing element comprising a filter assembly;

first and second one-way valves in fluid communication with said interior space whereby opening said first and second valves permits the backwash fluid to be discharged from said interior space to the tank interior;

first and second conduits, each of said first and second conduits having an upper outlet and a lower inlet disposed within the tank interior, said lower inlets in fluid communication with said tank interior and respectively spaced and positioned in alignment with said first and second valves whereby said first and second conduits receive the backwash fluid discharged from said interior space by said first and second valves and treatment media from the tank interior; and first and second outlet members respectively defining said upper outlets of said first and second conduits, said first and second outlet members being oriented to discharge the received backwash fluid and treatment media in a common rotational direction relative to the tank interior whereby a helical flow pattern is produced in the tank interior.

13. The water treatment system of claim 12 wherein each of said first and second outlet members extend and angle downwardly in a discharge direction.

14. The water treatment system of claim 12 wherein each of said first and second outlet members are angled downwardly at an approximately 5° angle relative to a horizontal plane.

15. The water treatment system of claim 12 wherein said first and second outlet members each comprise a shroud defining said upper outlets, said shrouds having an inverted substantially U-shaped cross section.

16. The water treatment system of claim 12 wherein said first and second outlet members each form an arcuate outlet passage defining said common rotational direction.

17. The water treatment system of claim 12 wherein said first and second outlet members each comprise a shroud defining said upper outlets, said shrouds having an inverted substantially U-shaped cross section, said shrouds each forming an arcuate outlet passage defining said common rotational direction, said passages extending in a discharge direction and angled downwardly in said discharge direction.

18. The water treatment system of claim 12 further comprising a cap member having a central collar engageable with the elongate conduit, and wherein said first and second outlet members comprise a portion of a cap member and are attached to said central collar, and said first and second outlet members respectively engage an upper end of said first and second conduits.

19. The water treatment system of claim 18 wherein said first and second outlet members each comprise a shroud defining said upper outlets, said shrouds having an inverted substantially U-shaped cross section.

20. The water treatment system of claim 18 wherein said first and second outlet members each form an arcuate outlet passage defining said common rotational direction.

21. The water treatment system of claim 18 wherein said first and second outlet members extend in a discharge direction towards said upper outlets and said outlet members are angled downwardly in said discharge direction.

22. The water treatment system of claim 12 wherein said housing element further comprises a third valve providing fluid communication between said filter assembly and said interior space whereby opening said third valve allows filtered water to enter said interior space from said filter assembly and closing said third valve inhibits the discharge of the backwash fluid from said interior space to said filter assembly.

23. The water treatment system of claim 22 wherein said filter assembly comprises a plurality of selectively attachable filter segments.

24. The water treatment system of claim 22 wherein said filter assembly comprises a plurality of selectively attachable filter segments, said filter segments defining filter slots having one of a plurality of predefined sizes when attached to said filter assembly, each of said filter segments having one of a plurality of predefined colors, each of said predefined colors corresponding to one of said predefined filter slot sizes.

25. The water treatment system of claim 24 wherein each of said filter segments further comprises a plurality of projecting locator pins on a first side and a plurality of locator holes on an opposite second side, said locator pins and locator holes located in predefined coordinated positions whereby when said filter segments are alignably stacked said plurality of locator pins of a first one of said filter segments is insertable into said plurality of locator holes of an adjacent second one of said filter segments.

* * * * *